(12) United States Patent
Fritsch et al.

(10) Patent No.: US 7,643,825 B2
(45) Date of Patent: Jan. 5, 2010

(54) SYSTEM AND METHOD FOR MANAGING DATA TO BE PUSHED TO A WIRELESS DEVICE WHEN THE DEVICE MAY BE OUTSIDE OF A COVERAGE RANGE

(75) Inventors: Brindusa Fritsch, Toronto (CA); Viera Bibr, Kilbride (CA); Michael Matovsky, Toronto (CA); Kamen Vitanov, Toronto (CA); Michael Shenfield, Richmond Hill (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 11/107,884

(22) Filed: Apr. 18, 2005

(65) Prior Publication Data

US 2006/0234743 A1     Oct. 19, 2006

(51) Int. Cl.
*H04B 7/00* (2006.01)
(52) U.S. Cl. ............... 455/422.1; 455/41.2; 455/514; 455/517; 370/352; 370/338; 709/224; 709/227
(58) Field of Classification Search ............ 455/456.3, 455/412.1, 412.2, 575.1, 421, 414.1, 422.1, 455/466, 514, 517, 41.2; 370/338, 352; 709/224, 709/227

See application file for complete search history.

(56) References Cited

U.S. PATENT DOCUMENTS

| | | | | |
|---|---|---|---|---|
| 5,991,810 | A * | 11/1999 | Shapiro et al. | 709/229 |
| 6,311,206 | B1 * | 10/2001 | Malkin et al. | 709/202 |
| 6,757,717 | B1 | 6/2004 | Goldstein | |
| 7,017,105 | B2 * | 3/2006 | Flanagin et al. | 714/798 |
| 7,136,634 | B1 * | 11/2006 | Rissanen et al. | 455/422.1 |
| 7,164,885 | B2 * | 1/2007 | Jonsson et al. | 455/41.2 |
| 7,366,515 | B2 * | 4/2008 | Zhao et al. | 455/445 |

(Continued)

FOREIGN PATENT DOCUMENTS

GB     2 294 132     * 4/1996

OTHER PUBLICATIONS

Tosi, D: "An Advanced Architecture for Push Services" Web Information Systems Engineering Workshops, 2003. Proceedings. Fourth International Conference on Rome, Italy Dec. 13, 2003, Piscataway, N.J., USA, IEEE, 2003, pp. 193-200, XP010697505, ISBN: 0-7695-2103-7, abstact, p. 3 figure 1, p. 6.

(Continued)

*Primary Examiner*—George Eng
*Assistant Examiner*—Brandon J Miller
(74) *Attorney, Agent, or Firm*—Gowling Lafleur Henderson LLP

(57) ABSTRACT

A push proxy server for pushing data to a wireless device having a coverage state of online or offline. The push proxy server comprises a coverage state detector, memory, a data store, and a transceiver. The coverage state detector determines the coverage state of the wireless device. The memory stores a coverage state indicator for indicating the coverage state of the wireless device. The data store stores the data to be pushed to the wireless device when the coverage state indicator indicates the wireless device is offline. The transceiver transmits the data to the wireless device when the coverage state indicator indicates the wireless device is online. A method for implementing the push proxy server is also described.

4 Claims, 3 Drawing Sheets

U.S. PATENT DOCUMENTS

| | | | |
|---|---|---|---|
| 2003/0036393 A1* | 2/2003 | Kanefsky | 455/466 |
| 2003/0095540 A1* | 5/2003 | Mulligan et al. | 370/352 |
| 2003/0123423 A1* | 7/2003 | Okanoue | 370/338 |
| 2004/0073582 A1* | 4/2004 | Spiegel | 707/204 |
| 2004/0148400 A1 | 7/2004 | Mostafa | |
| 2004/0205233 A1* | 10/2004 | Dunk | 709/238 |
| 2005/0063331 A1* | 3/2005 | Kim et al. | 370/328 |
| 2005/0119012 A1* | 6/2005 | Merheb et al. | 455/456.3 |
| 2005/0239494 A1* | 10/2005 | Klassen et al. | 455/550.1 |
| 2005/0249238 A1* | 11/2005 | Haumont | 370/466 |
| 2006/0077940 A1* | 4/2006 | Ganji | 370/338 |

OTHER PUBLICATIONS

"3rd Generation Partnership Project; Technical Specification Group Services and System Aspects; Support of Push Service (Release 5) 3GPP TR 23.875" ETSI Standards, European Telecommunications Standards Institute, Sophia-Antipo, FR, No. V510, Mar. 2002, XP014021954, ISSN: 0000-0001 p. 13-p. 14; Figure 6.6 ; p. 23-p. 27.

Search Report issued on Dec. 12, 2005 by the European Patent Office in connection with the corresponding European Patent Application No. 05103098.9-2413.

* cited by examiner

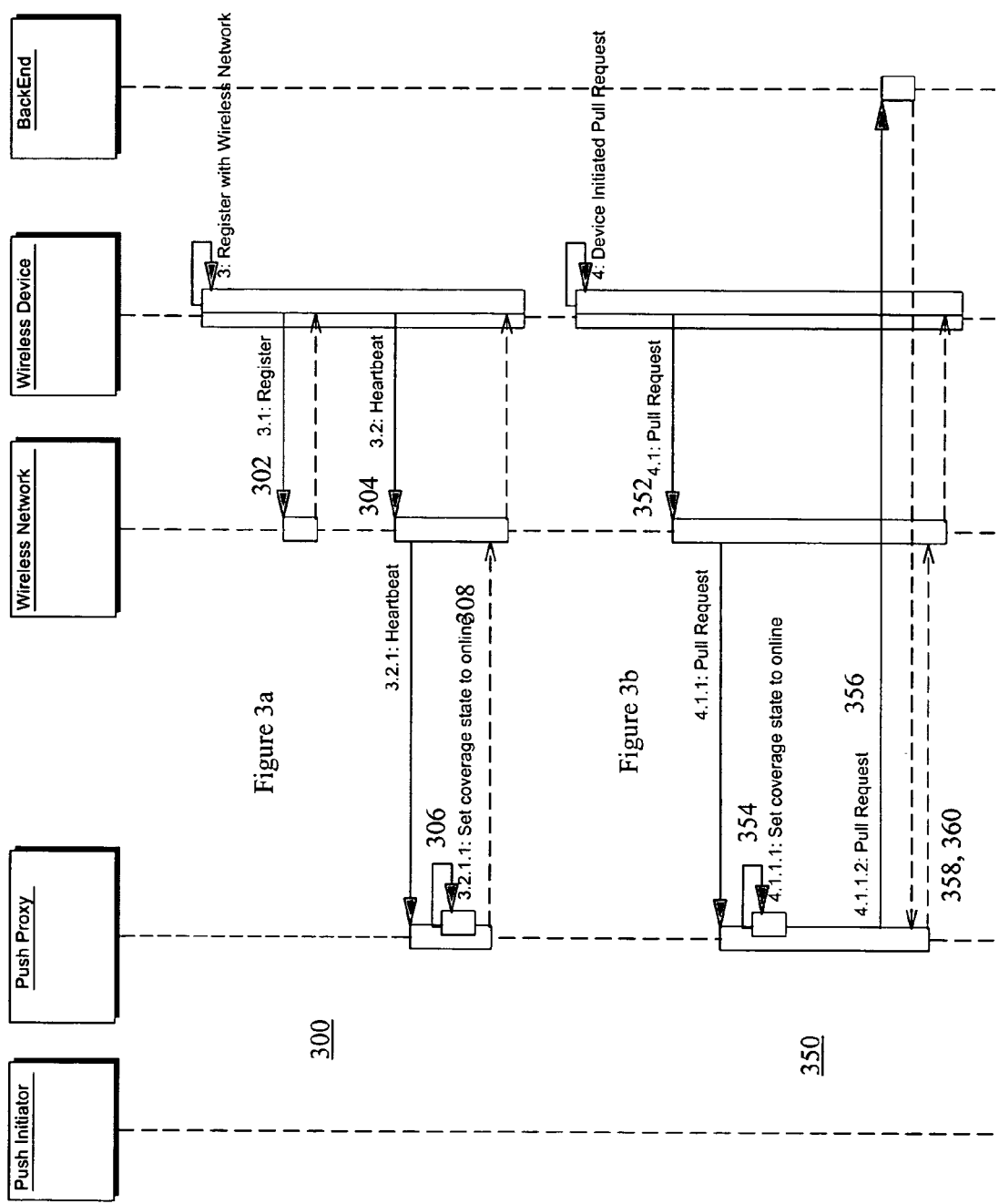

SYSTEM AND METHOD FOR MANAGING DATA TO BE PUSHED TO A WIRELESS DEVICE WHEN THE DEVICE MAY BE OUTSIDE OF A COVERAGE RANGE

The present invention relates generally to a system and method for pushing data to a wireless device and specifically to managing the data when the device may fall outside of a coverage range.

BACKGROUND OF THE INVENTION

Access to information has led to the success of the wireless communication device industry. Handheld wireless devices have successfully introduced portable devices that enable users to have wireless access to features such as electronic mail (e-mail) and the Internet. In the wireless device industry, there is a very clear trend towards facilitating "pushing" data, including electronic mail (e-mail) messages, application data, and notification messages, to the wireless device. The main reason for this trend is that it provides a high usability to wireless communication devices without requiring a device user to explicitly retrieve data. Such functionality is particularly useful for e-mail, but is also enables the device user to subscribe for notifications from various services. Further, push functionality allows service providers or corporate information technology departments, for example, to load or update software on the wireless communication device. Other uses and benefits of push technology will be realised as the technology matures.

Accordingly, it can be seen that push technology reduces the total volume of network traffic required to keep an image of remotely stored and manipulated data up-to-date by pushing data to the wireless device only when it is modified, rather than having the wireless device repeatedly poll for data updates. Although push technology can be used in a traditional client/server environment, the benefits of push technology are most significant in the wireless space, where processing and memory resources are scarce.

A challenge faced in the wireless space is overcoming volatile mobile device connectivity due to poor network links or devices falling out of coverage of a wireless communication network. In the absence of a reliable delivery protocol, pushed data can be lost and result in an inconsistent data state as perceived by a push initiator and the wireless device.

One solution to address this issue is the development of several levels of message reliability. Messages that are deemed to be important are assigned a high reliability level and protocols are implemented for ensuring message delivery. Messages that are deemed less essential are assigned a lower message reliability level and protocols are implemented for reducing overhead resources used.

However, in the presence of a reliable messaging protocol, regardless of the level, resources are wasted while the delivery protocol attempts to reach a wireless device that is offline.

SUMMARY OF THE INVENTION

Accordingly, it is an object of the present invention to obviate or mitigate at least some of the above-mentioned disadvantages. Specifically, how the push messages are handled reduces resource utilization when a target wireless device is offline of its corresponding wireless network.

In accordance with an aspect of the present invention there is provided a push proxy server for pushing data to a wireless device having a coverage state of online or offline, the push proxy server comprising: a coverage state detector for determining the coverage state of the wireless device; memory for storing a coverage state indicator for indicating the coverage state of the wireless device; a data store for storing the data to be pushed to the wireless device when the coverage state indicator indicates the wireless device is offline; and a transceiver for transmitting the data to the wireless device when the coverage state indicator indicates the wireless device is online.

In accordance with a further aspect of the present invention the push proxy server further comprises a waste manager for deleting stale data from the data store in accordance with an expiry term for the push data.

In accordance with yet a further aspect of the present invention there is provided a method for pushing data from a push initiator to a wireless device having a coverage state of online or offline, method comprising the steps of: determining, at a push proxy server, the coverage state of the wireless device; storing in memory a coverage state indicator for indicating the coverage state of the wireless device; storing in memory the data to be pushed to the wireless device when the coverage state indicator indicates the wireless device is offline; and transmitting the data to the wireless device when the coverage state indicator indicates the wireless device is online.

In accordance with yet a further aspect of the present invention, the method for pushing data from a push initiator to a wireless device further comprises the step of deleting stale data from the memory in accordance with an expiry field in the push data.

BRIEF DESCRIPTION OF THE DRAWINGS

An embodiment of the invention will now be described by way of example only with reference to the following drawings in which:

FIG. 3a is a sequence diagram illustrating an example of determining a change in coverage state; and FIG. 3b is a sequence diagram illustrating another example of determining a change in coverage state;

DETAILED DESCRIPTION OF THE PREFERRED EMBODIMENT

Figure 1:
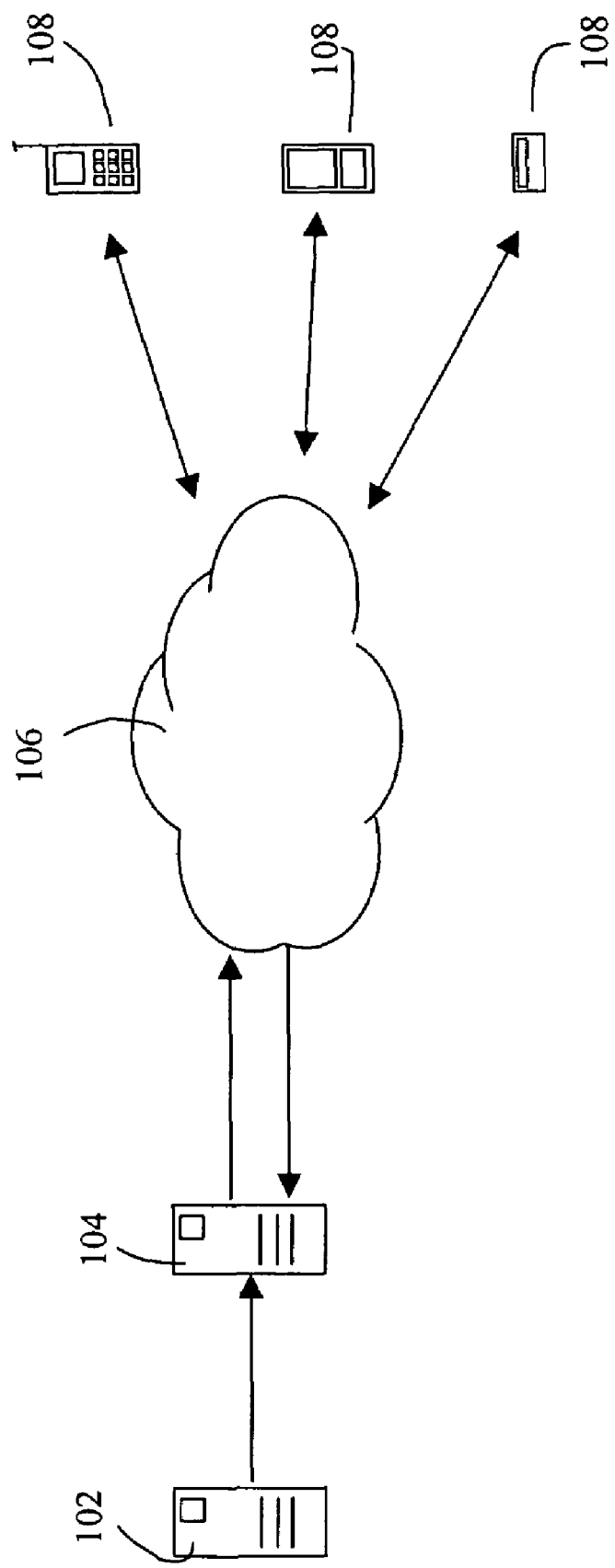
FIG. 1 is a block diagram illustrating a push system architecture.

For convenience, like numerals in the description refer to like structures in the drawings. Referring to FIG. 1, a system for implementing a push is illustrated generally by numeral 100. The system 100 includes a push initiator 102, a push proxy server 104, a wireless communication network 106 and a plurality of wireless devices 108.

The push initiator 102 is typically a backend server that periodically pushes data to one or more of the wireless devices 108. Alternately, the push initiator 102 may be a service provider or system administrator for providing updates to the wireless devices 108. Other types of push initiators will be apparent to a person of ordinary skill in the art.

The push proxy server 104 is a proxy server, such as a Blackberry Enterprise Server™ (BES) for example, that mediates data flow between the push initiator 102 and the wireless devices 108.

The wireless communication network 106 is a network that couples the push proxy server 104 with the wireless devices 108. The wireless communication network 106 has the capability to determine the delivery status of any given push request to one or more target wireless devices 108.

The wireless devices 108 may include laptops or mobile computers, smart phones, personal digital assistants, such as a Blackberry™ by Research in Motion for example, and the like.

A coverage state of a wireless device 108 refers to a connectivity state between the wireless device 108 and the wireless communication network 106. The possible states are online and offline. Online implies that the wireless device 108 is registered with and reachable via the wireless communication network 106. Offline implies that the wireless device 108 is not registered with or not reachable via the wireless communication network 106.

In accordance with the present embodiment a mechanism is provided at the push proxy server 104 to minimize the inconsistency between a data image at a wireless device 108 and a corresponding image at the push initiator 102 that is caused by wireless device 108 going offline in the absence of a reliable delivery protocol. In the presence of a reliable delivery protocol, the proposed mechanism minimizes resources wasted while attempting to reach a wireless device 108 while it is offline.

The push proxy server 104 monitors the coverage state of registered wireless devices 108 and uses the coverage state for deciding when to transmit pushed data to the wireless device. Further, the push proxy server 104 uses the delivery status of a push request as well as a wireless device heartbeat message to determine the coverage state for a wireless device 108. The operation of the push proxy server 104 is described in detail below.

Figure 2:
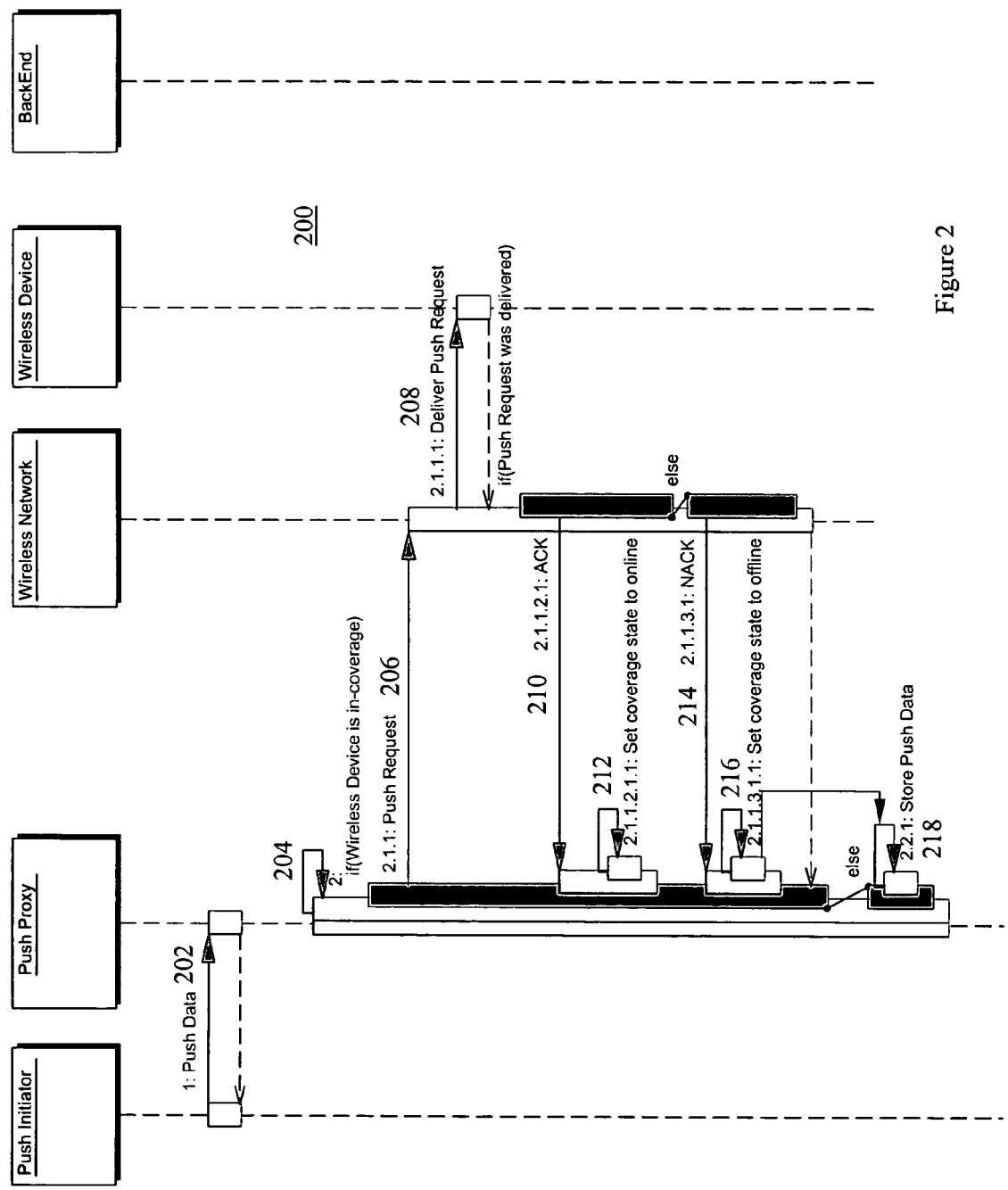
FIG. 2 is a sequence diagram illustrating a data push.

Referring to FIG. 2, a sequence diagram illustrating a data push in accordance with the present embodiment is illustrated generally by numeral 200. In step 202, the push initiator 102 transmits the data push to the push proxy server 104. In step 204, the push proxy server 104 checks the coverage state of the target wireless device 108 and determines whether it is online or offline. The initial state in the present embodiment is online, although it may also be the opposite. As previously described, the push proxy server 104 has a record of each registered wireless device 108 and its corresponding coverage state. If the wireless device is in coverage, the operation continues at step 206, otherwise the operation continues at step 218.

At step 206, the push proxy server 104 transmits the push data to the wireless communication network 106. In step 208, the wireless communication network 106 transmits the push data to the corresponding wireless device 108.

If the communication between the wireless communication network 106 and the communication device 108 is successful, the push proxy server 104 is advised accordingly in step 210 via a positive acknowledgment signal ACK. The positive acknowledgment signal ACK indicates that the push data was successfully delivered to the target wireless device 108 and, therefore, implies that wireless device 108 is online. Accordingly, in step 212 the coverage state of the wireless device stored at the push proxy server 104 is set to "online", and the data push is considered complete.

If, however, the communication between the wireless communication network 106 and the communication device 108 is unsuccessful, the push proxy server 104 is advised accordingly in step 214 via a negative acknowledgment signal NACK. The negative acknowledgment signal NACK indicates that the push data could not be delivered to the target wireless device 108 and, therefore, implies that the wireless device 108 was unable to be contacted and may be offline.

However, it should be noted that in the present embodiment, a negative acknowledgment signal NACK implies that a transport error was encountered while attempting to deliver the push data across the wireless communication network 106. Therefore, the error may not necessarily be due to loss of connection between the wireless device 108 and the wireless communication network 106, which would result in an offline scenario. Rather, for example, the transport error could be caused by a corruption of data.

Accordingly, in order to account for irregular and random transport errors, the push proxy server 104 returns to step 206 and attempts to retransmit the pushed data. This process is repeated up to a maximum predetermined number N of consecutive times before determining that the wireless device 108 is offline. If the transmission is successful before reaching N, the counter is reset.

The value for N is subject to optimization that depends on the network environment in which the system is deployed. In general, it should be noted that increasing the value for N reduces the algorithm's sensitivity to irregular transport errors, but decreases the responsiveness to device going offline. On the other hand, decreasing the value for N increases the algorithm's sensitivity to irregular transport errors, but increases the responsiveness to device going offline. That is, whenever N is high, the push proxy server 104 will rarely take the device offline due to irregular transport errors, but it will take longer to detect that the device actually went offline. If the value of N is low, the push proxy server 104 is more likely to take the device offline due to irregular transport errors, but it will take less time to detect that the device actually went offline.

In the present embodiment, the maximum predetermined number N represents the number of consecutive transmission failures per-device. That is, the number of transmission failures amongst all pushed data to a given device, which may be done in a concurrent fashion, for example, per-application. Accordingly, the counter is incremented each time a consecutive transmission to the device fails, regardless of the message. The counter is reset as soon as any one of the messages is successfully transmitted. By re-transmitting the push data up to N times, the probability that the lack of communication between the wireless communication network 106 and the wireless device 108 is a result of a random transport error is reduced.

Thus, the above algorithm limits coverage status changes due to random and irregular transport errors and changes coverage status primarily in response to more persistent transport errors such as the wireless device 108 being offline. Arguably the algorithm does not filter out other persistent errors such as a malfunctioning transmitter. However, persistent errors have the same consequences as the wireless device 108 being offline since it results in a prolonged absence of device connectivity. Thus, the algorithm not only succeeds in detecting transport errors due to offline scenario but also in detecting other errors that cause similar loss-of-connectivity symptoms.

If the maximum number N of retries is reached without receiving an ACK signal from the wireless communication network 106, in step 216 the coverage state of the wireless device stored at the push proxy server 104 is changed to reflect that the wireless device 108 is offline.

The operation continues at step 218 and the push data is saved in a persistent store for later transmission to the wireless device 108. Specifically, when the coverage state record of a wireless device 108 changes from offline to online, the push data saved in the persistent store destined for the wireless device 108 is transmitted.

The following describes different methods by which the coverage state record at the push proxy server 104 can change from offline to online. Referring to FIG. 3a, a sequence diagram illustrating a coverage state record change in response to a heartbeat message is illustrated generally by numeral 300. In step 302, the wireless device 108 registers with the wireless communication network 106. As is standard in the art, each wireless device 108 is configured to register with the wireless communication network 106 when the device detects the wireless communication network 106 after being offline due to a lack of network service or being powered off, for example.

Once the wireless device 108 is registered, in step 304 it transmits a heartbeat message to the push proxy server 104 via the wireless communication network 106. The heartbeat message is a part of the protocol used between push proxy server 104 and the wireless devices 108. According to such a protocol, the wireless device 108 sends the heartbeat message to the push proxy server 104 whenever it registers with the wireless network 106. Furthermore, the wireless device 108 periodically sends the heartbeat message to the push proxy server 104 in order to handle the special case when the push proxy server 104 initiates a device online to device offline transition in response to irregular transport errors. Although the present embodiment limits this from occurring, it may not be completely prevented.

In step 306, upon receiving the heartbeat message, the push proxy server 104 updates the coverage state record to indicate that the wireless device coverage state is online. The push proxy server 104 determines if there is any push data in the persistent store to transmit to the wireless device 108. If there is push data to transmit, the operation proceeds to step 308 and the push data is transmitted in accordance with data push operation described with reference to FIG. 2. The push data may also be sent in batches if there is a significant amount of stored data in order to reduce the load on the wireless communication network 106 as well as the impact on the wireless device 108.

As an alternate to the example described with reference to FIG. 3a, the coverage state record is changed from offline to online in response to a pull request from the wireless device 108. In the present embodiment, the push proxy server 104 is also set-up as a 'pull' proxy server for the wireless device 108 and, as such mediates pull requests on its behalf. Therefore, due a convenient configuration of the push proxy server 104 it is aware of the 'pull' traffic initiated by the wireless device 108. Alternately, an external pull proxy server may be configured to communicate the device 'pull' traffic" to the push proxy server 104. A pull request occurs when the wireless device 108 actively requests data, rather than having data pushed to it.

Referring to FIG. 3b, a sequence diagram illustrating a coverage state record change in response to a pull request is illustrated generally by numeral 350. In step 352, the wireless device 108 transmits a pull request via the wireless communication network 106, which is communicated to the push proxy server 104. In step 354, upon receiving notice of the pull request, the push proxy server 104 updates the coverage state record to indicate that the wireless device coverage state is online. In step 356, the push proxy server 104 transmits the pull request to a corresponding backend server and waits for a response. In step 358, the push proxy server 104 transmits the response to the pull request in accordance with data push method described with reference to FIG. 2.

Additionally, in step 360, the push proxy server 104 determines if there is any push data in the persistent store to transmit to the wireless device 108. If there is push data to transmit, the push data is transmitted in accordance with data push operation described with reference to FIG. 2.

The timing of the sequences may vary between different scenarios as will be appreciated by a person skilled in the art. For example, the pushy proxy server 104 may wait for the pull request to be completed before determining if there is any push data in the persistent store to transmit. Alternately, the pushy proxy server 104 may transmit any push data in the persistent store, if available, without waiting for a response to the pull request from the backend server. Yet alternately, the pushy proxy server 104 may transmit the response to the pull request along with the push data to the wireless device 108. As described with reference to the previous example, the transmitted data may be sent in batches.

Further to the description above, in the case of a prolonged duration where the wireless device 108 is offline, the push data in the persistent store on the push proxy server 104 that is pending delivery may become outdated, or stale. For example, consider push data that describes a temporary state change. If the wireless device 108 is still offline by the time the temporary state change expires, it may not be necessary to transmit the push data at all. Similarly, consider push data that describes a state that is frequently updated. If an updated push data is received at the push proxy server 104 while the wireless device 108 is still offline, it may not be necessary to transmit the previous push data at all.

Accordingly, to avoid wasting resources associated with storing and delivering stale data, the push proxy server 104 includes a waste manager for enforcing an expiry term on the pushed data. The expiry term is set based on the nature of the pushed data, and is system specific. If the push proxy server 104 cannot determine the expiry term for the push data, a default expiry term is assigned. The push proxy server discards the expired push data. Depending on the protocol used between push initiator 102 and push proxy server 104, notification may be sent to the push initiator when expired data is deleted.

In the present embodiment, the header of the push data includes an expiry field indicating its expiry term. Depending on the system, the expiry term may be a preset date and/or time or a predefined duration. Further, the header may include an overwrite field, which will allow the push proxy server 104 to discard the push data upon receipt of updated push data, if the updated push data arrives before the push data has been transmitted. Other time stamp mechanisms and schemes will be apparent to a person of ordinary skill in the art.

In an alternate embodiment, the push proxy server defines a default expiry term for all push data. This default expiry term may be overwritten by some system logic at the push proxy server 104, if the system is designed accordingly. It should be noted that the push proxy server 104 is not restricted in the protocol that is used to communication with the push initiator 102. Therefore, if the communication protocol supports transmission of expiry data then the system logic implemented at the push proxy server 104 can use transmitted expiry data to overwrite the default expiry data.

Thus it can be seen that the present embodiment reduces the amount of resources wasted as a result of transmitting stale data, including storage space at the push proxy server 104, transmission bandwidth across the wireless communication network 106 and processing at the wireless device 108.

Although the present embodiment has been exemplified specifically with reference to a push proxy server 104 that delivers push data to a wireless device, it will be apparent to one skilled in the art that the push proxy server 104 can transmit the push data to multiple wireless devices 108 if the push data has multiple targets.

Further, delivery guarantees between the push proxy server 104 and the wireless network 106 are system specific and are specified by the delivery protocol used there between. Accordingly, it will be apparent that any number of delivery guarantee protocols can be implemented for the present embodiment, as required by the system design.

Accordingly, although preferred embodiments of the invention have been described herein, it will be understood by those skilled in the art that variations may be made thereto without departing from the spirit of the invention or the scope of the appended claims.

What is claimed is:

1. A push proxy server for pushing data to a wireless device having a coverage state of online or offline, the push proxy server comprising:
   (a) a coverage state detector for determining the coverage state of the wireless device;
   (b) memory for storing a coverage state indicator for indicating the coverage state of the wireless device;
   (c) a data store for storing the data to be pushed to the wireless device when the coverage state indicator indicates the wireless device is offline;
   (d) a transceiver for transmitting the data to the wireless device when the coverage state indicator indicates the wireless device is online; and
   (e) a waste manager configured to delete stale data from the data store in accordance with a predefined expiry term prior to transmitting the data to the wireless device, and wherein the expiry term is defined by an expiry field of a message header in a message containing the data, and wherein the expiry field indicates that the stale data is to be deleted upon receipt of replacement data, the replacement data comprising an updated version of the stale data.

2. A push proxy server for pushing data to a wireless device having a coverage state of online or offline, the push proxy server comprising:
   (a) a coverage state detector for determining the coverage state of the wireless device;
   (b) memory for storing a coverage state indicator for indicating the coverage state of the wireless device;
   (c) a data store for storing the data to be pushed to the wireless device when the coverage state indicator indicates the wireless device is offline;
   (d) a transceiver for transmitting the data to the wireless device when the coverage state indicator indicates the wireless device is online; and
   (e) a waste manager configured to delete stale data from the data store in accordance with a predefined expiry term prior to transmitting the data to the wireless device, wherein the expiry term is defined by an expiry field of a message header in a message containing the data, and wherein the waste manager sends a notification to a sender of the data when stale data is deleted.

3. A method for pushing data from a push initiator to a wireless device having a coverage state of online or offline, the method comprising the steps of:
   (a) determining, at a push proxy server, the coverage state of the wireless device;
   (b) storing in memory a coverage state indicator for indicating the coverage state of the wireless device;
   (c) storing in a data store the data to be pushed to the wireless device when the coverage state indicator indicates the wireless device is offline;
   (d) transmitting the data to the wireless device when the coverage state indicator indicates the wireless device is online; and
   (e) deleting stale data from the data store in accordance with a predefined expiry term prior to transmitting the data to the wireless device, wherein the expiry term is defined by an expiry field of a message header in a message containing the data, and wherein the expiry field indicates that the stale data is to be deleted upon receipt of replacement data, the replacement data comprising an updated version of the stale data.

4. A method for pushing data from a push initiator to a wireless device having a coverage state of online or offline, the method comprising the steps of:
   (a) determining, at a push proxy server, the coverage state of the wireless device;
   (b) storing in memory a coverage state indicator for indicating the coverage state of the wireless device;
   (c) storing in a data store the data to be pushed to the wireless device when the coverage state indicator indicates the wireless device is offline;
   (d) transmitting the data to the wireless device when the coverage state indicator indicates the wireless device is online; and
   (e) deleting stale data from the data store in accordance with a predefined expiry term prior to transmitting the data to the wireless device, wherein the expiry term is defined by an expiry field of a message header in a message containing the data, and
   (f) further comprising the step of sending a notification to a sender of the data when stale data is deleted.

* * * * *